UNITED STATES PATENT OFFICE.

JAMES H. STEBBINS, JR., OF NEW YORK, N. Y.

IMPROVEMENT IN COLORING-MATTERS DERIVED FROM TOLUOL.

Specification forming part of Letters Patent No. 221,120, dated October 28, 1879; application filed May 14, 1879.

*To all whom it may concern:*

Be it known that I, JAMES H. STEBBINS, Jr., of the city, county, and State of New York, have invented a new and useful Improvement in Coloring-Matters, which improvement is fully set forth in the following specification.

This invention relates to an orange color or dye-stuff, which I term "toluol-orange," and which is obtained by the reaction of diazo-benzole nitrate.

To a ten-per-cent. solution of toluylendiamine in strong alcohol I add, under continual stirring, an aqueous one-per-cent. solution of diazo-benzole nitrate. Immediately the liquid assumes a deep orange-red or almost blood-red color, and after an hour's standing fine red crystals make their appearance. These are then thrown on a filter and allowed to drain. After the mother-liquor has all drained off they are dissolved in boiling water, and reprecipitated by ammonia-water as an orange-colored crystalline precipitate, and are thus obtained in a pure state.

By adding ammonia-water to the mother-liquor a large number of crystals are obtained, and these are then purified, as before mentioned. The basic coloring-matter thus obtained dissolves in boiling water readily, to which it imparts an orange color. Alcohol dissolves it easily with the same color.

By adding strong hydrochloric acid to the base dissolved in water, a chloride is obtained which has the appearance of a blood-red crystalline precipitate. This dissolves in water with a deep orange color. It is also dissolved by alcohol.

For dyeing animal fiber the toluol-orange is employed in an acid-dye bath, with or without metallic mordants, and may also be used for dyeing cotton by employing its property of forming insoluble compounds with some metallic salts—such, for instance, as oleate of lead or aluminate of zinc.

What I claim as new, and desire to secure by Letters Patent, is—

As a new manufacture, the orange coloring-matter produced by the action of diazo-benzole nitrate on the alcoholic solution of toluylendiamine, as described, or by any other means which will produce a like result.

In testimony that I claim the foregoing I have hereunto set my hand and seal this 1st day of May, 1879.

JAMES H. STEBBINS, JR. [L. S.]

Witnesses:
  W. HAUFF,
  E. F. KASTENHUBER.